United States Patent
Wakatsuki (10) Patent No.: US 10,065,610 B2
(45) Date of Patent: Sep. 4, 2018

(54) PERIPHERAL INFORMATION DETECTION DEVICE AND SELF-DRIVING VEHICLE

(71) Applicant: TOYOTA JIDOSHA KABUSHIKI KAISHA, Toyota-shi, Aichi-ken (JP)

(72) Inventor: Kazutoshi Wakatsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 14/969,431

(22) Filed: Dec. 15, 2015

(65) Prior Publication Data

US 2016/0244028 A1    Aug. 25, 2016

(30) Foreign Application Priority Data

Feb. 25, 2015   (JP) .................. 2015-035769

(51) Int. Cl.
| | |
|---|---|
| *B60S 1/62* | (2006.01) |
| *B08B 1/04* | (2006.01) |
| *B60S 1/56* | (2006.01) |
| *B08B 1/00* | (2006.01) |
| *G02B 27/00* | (2006.01) |
| *G01S 13/93* | (2006.01) |
| *G01S 7/497* | (2006.01) |

(52) U.S. Cl.
CPC ............ *B60S 1/62* (2013.01); *B08B 1/005* (2013.01); *B08B 1/04* (2013.01); *B60S 1/56* (2013.01); *B60S 1/566* (2013.01); *G02B 27/0006* (2013.01); *B08B 1/008* (2013.01); *G01S 2007/4977* (2013.01); *G01S 2013/9367* (2013.01); *G01S 2013/9382* (2013.01)

(58) Field of Classification Search
CPC ........... B08B 1/04; B08B 1/006; B08B 1/008; B08B 1/005; B60S 1/566; B60S 1/62; B60S 1/56; H04L 67/12; G01S 2013/9382; G01S 2013/9367; G01S 2007/4977; G02B 27/0006; G05D 1/0272; G05D 1/027; G05D 1/0278; G05D 1/0255
See application file for complete search history.

(56) References Cited

U.S. PATENT DOCUMENTS

| | | | | |
|---|---|---|---|---|
| 8,567,963 | B1 * | 10/2013 | Criscuolo | G02B 27/0006 359/507 |
| 2002/0139394 | A1 * | 10/2002 | Bronson | B08B 17/02 134/6 |
| 2002/0174910 | A1 * | 11/2002 | Willeke, Jr. | B60S 3/045 141/95 |
| 2008/0072393 | A1 * | 3/2008 | Tanaka | A47L 1/02 15/250.03 |

(Continued)

FOREIGN PATENT DOCUMENTS

| | | | |
|---|---|---|---|
| JP | S60-252042 A | | 12/1985 |
| JP | 2001149274 | * | 6/2001 |

(Continued)

*Primary Examiner* — Kimberly S Berona
*Assistant Examiner* — Aaron C Smith
(74) *Attorney, Agent, or Firm* — Oliff PLC (57) ABSTRACT

A peripheral information detection device includes a device body that is mounted with sensors each including a detection section that detects peripheral information, and a wiping mechanism that wipes off foreign objects that have adhered to locations of the device body facing the detection sections.

7 Claims, 5 Drawing Sheets

(56) References Cited

U.S. PATENT DOCUMENTS

| | | | |
|---|---|---|---|
| 2008/0215202 A1* | 9/2008 | Breed | G01C 21/3611 |
| | | | 701/25 |
| 2009/0212130 A1* | 8/2009 | Franklin, Jr. | B60S 1/485 |
| | | | 239/284.1 |
| 2010/0020306 A1 | 1/2010 | Hall | |
| 2011/0073142 A1 | 3/2011 | Hattori et al. | |
| 2012/0117745 A1 | 5/2012 | Hattori et al. | |
| 2015/0185592 A1* | 7/2015 | Eineren | G03B 17/02 |
| | | | 348/375 |
| 2016/0121855 A1* | 5/2016 | Doorley | B60S 1/566 |
| | | | 134/6 |

FOREIGN PATENT DOCUMENTS

| | | |
|---|---|---|
| JP | 2006-103442 A | 4/2006 |
| JP | 2008-179244 A | 8/2008 |
| JP | 2011-240920 A | 12/2011 |
| WO | WO2014006500 * | 9/2014 |

* cited by examiner

PERIPHERAL INFORMATION DETECTION DEVICE AND SELF-DRIVING VEHICLE

CROSS-REFERENCE TO RELATED APPLICATION

This application claims priority under 35 USC 119 from Japanese Patent application No. 2015-035769 filed on Feb. 25, 2015, the disclosure of which is incorporated by reference herein.

BACKGROUND OF THE INVENTION

Technical Field

The present invention relates to a peripheral information detection device and an self-driving vehicle.

Related Art

The specification of United States Patent Application Laid-Open No. 2010/0020306 describes a structure in which a lidar system (peripheral information detection device) mounted with a sensor including a photon detector (detection section) for detecting peripheral information of a vehicle is disposed on the roof of the vehicle.

SUMMARY

However, the peripheral information detection device is exposed to wind and rain, such that the device body sometimes becomes dirty and so on, and the detection precision of the sensor is reduced. There is accordingly room for improvement from the perspective of well maintaining the detection precision of the sensor.

In consideration of the above circumstances, an object of the present invention is to obtain a peripheral information detection device and an self-driving vehicle capable of well maintaining the detection precision of a sensor.

A peripheral information detection device according to a first aspect includes a device body that is mounted with a sensor including a detection section that detects peripheral information, and a wiping mechanism that wipes off a foreign object that has adhered to a location of the device body facing the detection section.

In the peripheral information detection device according to the first aspect, the sensor that includes the detection section that detects peripheral information is mounted to the device body. The wiping mechanism that wipes the device body is also provided, and the wiping mechanism wipes off a foreign object that has adhered to the location of the device body facing the detection section. This enables a reduction in the detection rate of peripheral information by sensor to be suppressed.

A peripheral information detection device according to a second aspect is the first aspect, wherein the wiping mechanism includes: a rotary shaft that is provided so as to be capable of rotating with respect to the device body; a wiper that is attached to the rotary shaft, that abuts the surface of the location of the device body facing the detection section, and that swings around along the device body accompanying rotation of the rotary shaft; and a nozzle that applies cleaning fluid to the surface of the device body.

In the peripheral information detection device according to the second aspect, the wiper is swung around about the device body by rotating the rotary shaft. Thus, even in cases in which plural sensors are mounted to the device body, for example, foreign objects that have adhered to locations facing the detection sections of the plural sensors can be continuously wiped off, simply by rotating the rotary shaft.

Moreover, applying cleaning fluid to the surface of the device body through the nozzle enables dirt on the device body to be effectively removed.

A peripheral information detection device according to a third aspect is the second aspect, further including a receiving dish that receives cleaning fluid that has been applied to the device body through the nozzle, and a pump that pumps up the cleaning fluid that has accumulated in the receiving dish and supplies the cleaning fluid to the nozzle.

The peripheral information detection device according to the third aspect enables the cleaning fluid to be circulated and used repeatedly.

An self-driving vehicle of a fourth aspect includes the peripheral information detection device of any one of the first aspect to the third aspect, and a control section that controls running of the vehicle based on peripheral information detected by the peripheral information detection device.

The self-driving vehicle according to the fourth aspect enables the detection precision of the sensor to be well maintained, regardless of the surrounding environment, such as the weather. This enables the running performance of the vehicle to be well maintained.

Advantageous Effects of Invention

As explained above, the peripheral information detection device according to the first aspect has an excellent advantageous effect of enabling the detection precision of the sensor to be well maintained.

The peripheral information detection device according to the second aspect has an excellent advantageous effect of enabling foreign objects and dirt that have adhered to the device body to be effectively removed.

The peripheral information detection device according to the third aspect has an excellent advantageous effect of enabling the amount of cleaning fluid consumed to be reduced.

The self-driving vehicle according to the fourth aspect has an excellent advantageous effect of enabling automatic driving to be performed, regardless of the surrounding environment, such as the weather.

BRIEF DESCRIPTION OF THE DRAWINGS

Embodiments of the present invention will be described in detail based on the following figures, wherein.

DETAILED DESCRIPTION OF THE INVENTION

First Exemplary Embodiment

Explanation follows regarding a peripheral information detection device according to a first exemplary embodiment of the present invention, with reference to FIG. 1 to FIG. 4. Note that in FIG. 1 as appropriate, the arrow FR indicates the vehicle front side, the arrow UP indicates the vehicle upper side, and the arrow OUT indicates the vehicle width direction outside of an self-driving vehicle to which the peripheral information detection device is attached. In the below explanation, unless specifically stated otherwise, reference to the front-rear, up-down, and left-right directions refers to front-rear in the vehicle front-rear direction, up-down in the vehicle up-down direction, and left-right when facing the direction of travel.

Figure 1:
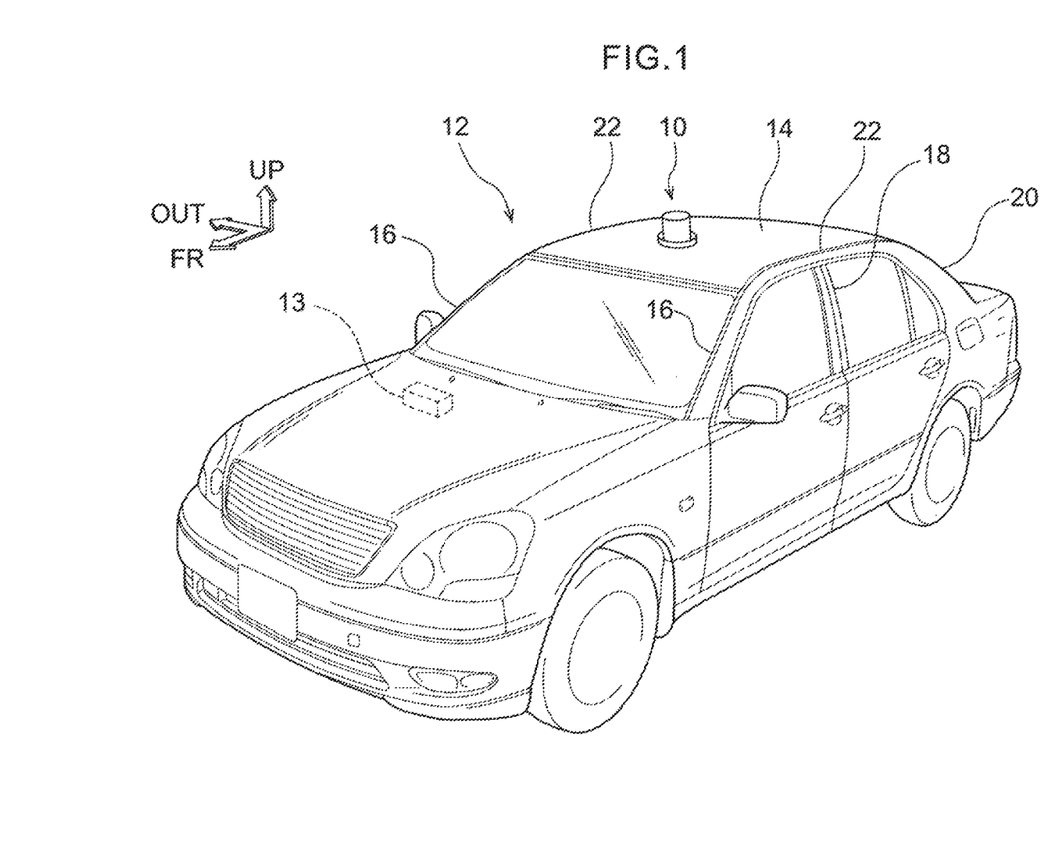
FIG. 1 is a perspective view of a vehicle mounted with a peripheral information detection device according to a first exemplary embodiment, viewed diagonally from above.

As illustrated in FIG. 1, a peripheral information detection device 10 is attached to a roof panel 14 of an self-driving vehicle 12 (hereafter simply referred to as "vehicle 12"). Specifically, a front pillar 16 running along the vehicle up-down direction is installed at either vehicle side section of the vehicle 12 provided with the peripheral information detection device 10. A center pillar 18 running along the vehicle up-down direction is installed further to the vehicle rear side than each front pillar 16. A rear pillar 20 running along the vehicle up-down direction is installed further to the vehicle rear side than each center pillar 18. An upper end portion of the front pillar 16, an upper end portion of the center pillar 18, and an upper end portion of the rear pillar 20 are coupled together by a roof side rail 22 extending along the vehicle front-rear direction. A pair of the roof side rails 22 are disposed at the left and right, and the roof panel 14 is disposed between the pair of roof side rails 22. The peripheral information detection device 10 is attached on the roof panel 14.

Note that the vehicle 12 is provided with a controller 13, serving as a control section that controls running of the vehicle 12 based on the peripheral information detected by the peripheral information detection device 10. The peripheral information detection device 10 and the controller 13 are electrically connected. The vehicle 12 is thereby configured such that the vehicle 12 can be run by the controller 13 without the vehicle 12 being driven by a driver. Note that in the present exemplary embodiment, configuration is such that switching can be performed between a driving mode in which the vehicle 12 is driven based on peripheral information detected by the peripheral information detection device 10, and a driving mode in which the driver drives the vehicle themself by operating a steering wheel, not illustrated in the drawings.

Configuration of Peripheral Information Detection Device

Figure 2:
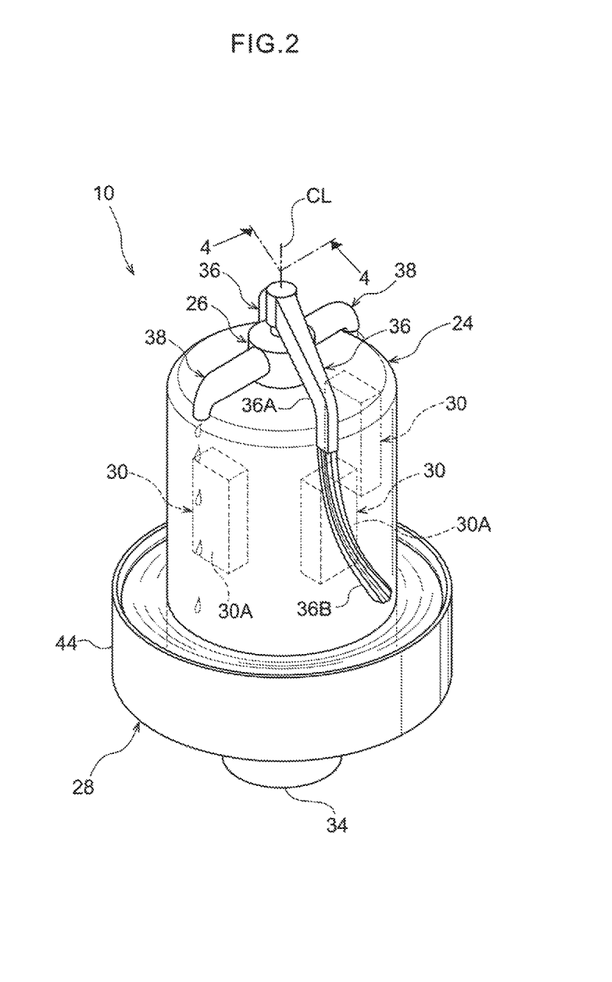
FIG. 2 is a perspective view illustrating a peripheral information detection device according to the first exemplary embodiment, viewed diagonally from above.
Figure 3:
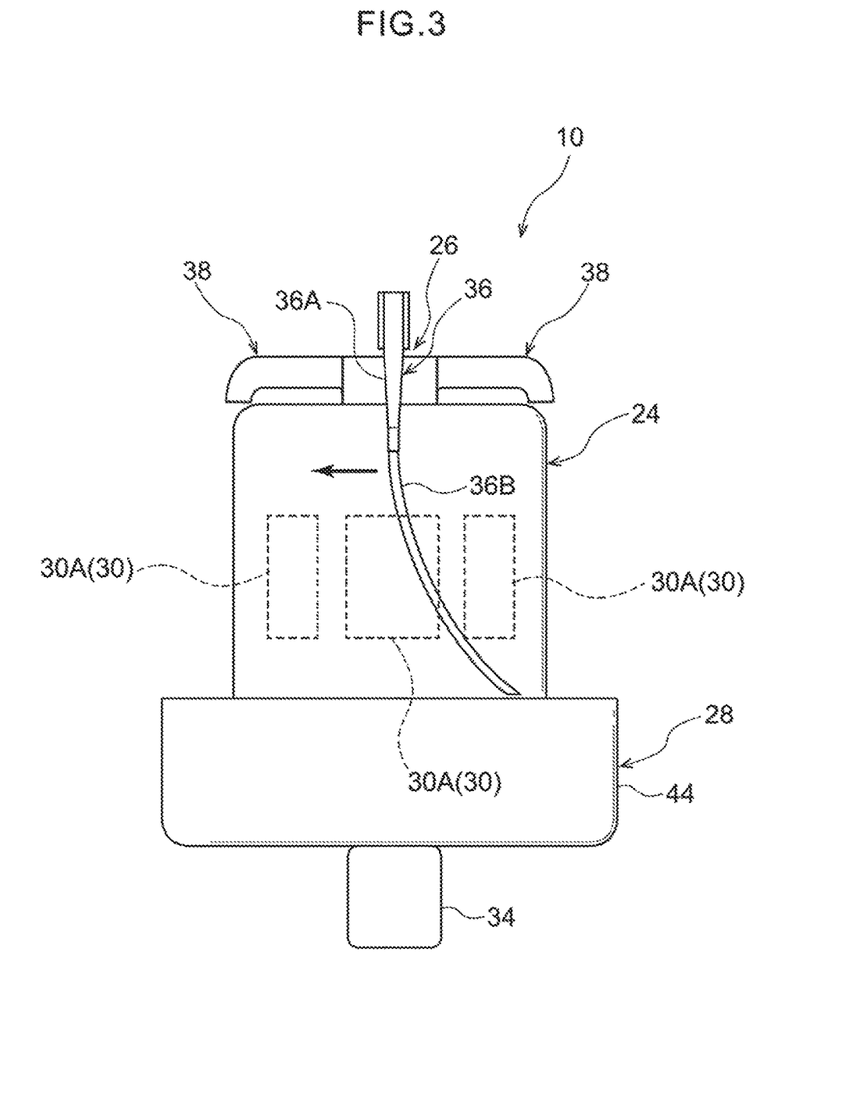
FIG. 3 is a front view of the peripheral information detection device in FIG. 2, viewed from the front.
Figure 4:
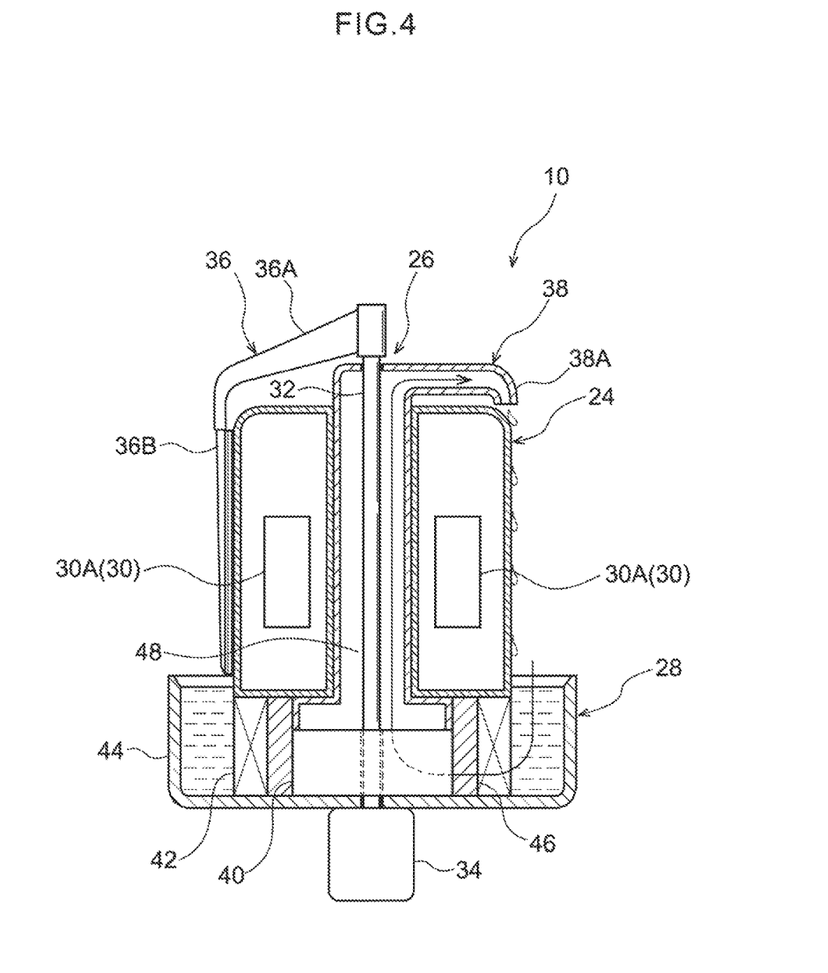
FIG. 4 is a cross-section sectioned along line 4-4 in FIG. 2.

As illustrated in FIG. 2 to FIG. 4, the peripheral information detection device 10 is mainly configured including a device body 24, a wiping mechanism 26, a cleaning fluid circulation device 28, and heaters 46. The device body 24 is formed in a substantially circular tube shape with its axial direction along the vehicle up-down direction, and is formed of a material through which electromagnetic waves, including laser light and visible light, permeate. Plural sensors 30 are mounted to side portions of the device body 24, and four of the sensors 30 are mounted in the present exemplary embodiment as an example (three sensors are illustrated in FIG. 2).

The sensors 30 are each disposed at an outer peripheral side of an inner portion of the device body 24, and are disposed at the vehicle front side, the vehicle rear side, the vehicle right side, and the vehicle left side, with a center line CL of the device body 24 interposed therebetween. Each sensor 30 is provided with a detection section 30A at the outer peripheral side of the device body 24. Configuration is such that the peripheral information of the device body 24 can be detected by the detection sections 30A. Note that millimeter-wave radar, laser radar, an optical camera, or the like may be employed as each sensor 30. In cases in which millimeter-wave radar is employed, the detection section is formed by a radio wave transmitter and receiver. In cases in which laser radar is employed, the detection section is formed by a laser light emitting portion and receiving portion. In cases in which an optical camera is employed, the detection section is formed by a visible light receiving portion.

As illustrated in FIG. 4, the wiping mechanism 26 is mainly configured including a rotary shaft 32, wipers 36, and nozzles 38. The rotary shaft 32 extends in the vehicle up-down direction along the center axis of the device body 24, and a lower end portion of the rotary shaft 32 is coupled to a drive shaft of a motor 34 that is disposed further to the lower side than the device body 24. Configuration is thereby such that the rotary shaft 32 is rotated about the axis of the device body 24 by driving the motor 34.

An upper end portion of the rotary shaft 32 extends further upward than the device body 24, and a wiper arm 36A of each wiper 36 is attached to the upper end portion. Each wiper 36 is configured including the wiper arm 36A and a wiper blade 36B, and the wiper arm 36A extends diagonally downward on progression from the rotary shaft 32 toward an outer peripheral face of the device body 24. A leading end portion of the wiper arm 36A bends toward the lower side, and the wiper blade 36B is attached to the leading end portion.

The wiper blade 36B extends in the vehicle up-down direction along the outer peripheral face of the device body 24, and an upper end portion of the wiper blade 36B is attached to the leading end portion of the wiper arm 36A. A lower end portion of the wiper blade 36B extends as far as the lower end portion of the device body 24. The wiper blade 36B abuts from an upper end portion across to a lower end portion of the outer peripheral face of the device body 24 (a location facing the detection sections 30A). Configuration is such that the wiper blade 36B is swung around in a state abutting the outer peripheral face of the device body 24 by rotating the rotary shaft 32.

As illustrated in FIG. 3, the wiper blade 36B is curved toward the opposite side to the rotation direction (the direction of the arrow in FIG. 3) on progression from the upper end portion toward the lower end portion thereof. Note that the wiper blade 36B is formed by a flexible member such as rubber in the present exemplary embodiment as an example; however, the present invention is not limited thereto. For example, a wiper blade may be employed that has an abutting portion with the device body 24 configured in brush form.

As illustrated in FIG. 4, a pair of the nozzles 38 are attached to the rotary shaft 32. The nozzles 38 are disposed further upward than the device body 24, and extend out from the rotary shaft 32 toward the outer peripheral side of the device body 24. A nozzle hole 38A is formed in a leading end portion of each nozzle 38, and configuration is such that cleaning fluid can be dripped onto (applied to) the outer peripheral face of the device body 24 through the nozzle holes 38A. Note that the nozzles 38 swing around together with the wipers 36 about the outer peripheral face of the device body 24 when the rotary shaft 32 is rotated. The nozzles 38 are connected a pump 40 of the cleaning fluid circulation device 28, described below, and configured such that cleaning fluid is supplied from the pump 40.

The cleaning fluid circulation device 28 mainly includes a receiving dish 44, a filter 42, and the pump 40. The receiving dish 44 is disposed below the device body 24, and is formed in a bottomed, circular tube shape open toward the vehicle upper side. The receiving dish 44 is formed with a larger diameter than the device body 24, and is configured so as to be capable of receiving cleaning fluid that has run down along the outer peripheral face of the device body 24.

The filter 42 is disposed inside the receiving dish 44. The filter 42 is formed in a substantially circular tube shape, and a center side and an outer peripheral side of the receiving dish 44 are separated from each other by the filter 42. Foreign objects in the cleaning fluid are thereby captured by the filter 42 when the cleaning fluid passes through the filter 42 and moves from the outer peripheral side to the center side of the receiving dish 44.

The heaters 46 are disposed further to the center side of the receiving dish 44 than the filter 42. Plural of the heaters 46 are disposed along the filter 42, and an upper end portion of each heater 46 abuts a lower face of the device body 24. Note that the heaters 46 are configured so as to be heated by conduction, and cleaning fluid that has accumulated in the receiving dish 44, and the device body 24, are heated by the heaters 46 being heated.

The pump 40 is disposed further to the center side of the receiving dish 44 than the heaters 46. A cleaning fluid supply path 48, which extends in the up-down direction along a center portion of the device body 24, is coupled to the pump 40. An upper end portion of the cleaning fluid supply path 48 is in communication with the nozzles 38. Configuration is thereby such that cleaning fluid that has accumulated in the receiving dish 44 is pumped upward when the pump 40 is operated, and the cleaning fluid can be supplied to the nozzles 38 through the cleaning fluid supply path 48.

Operation and Advantageous Effects

Explanation follows regarding operation and advantageous effects of the vehicle 12 including the peripheral information detection device 10 according to the present exemplary embodiment. As illustrated in FIG. 1, in the present exemplary embodiment, the peripheral information detection device 10 is provided to the vehicle 12. The vehicle 12 can be run based on peripheral information detected by the sensors 30 of the peripheral information detection device 10. Specifically, as illustrated in FIG. 2, in the present exemplary embodiment, the sensors 30 are respectively mounted at the vehicle front side, the vehicle rear side, the vehicle right side, and the vehicle left side of the device body 24. Each sensor 30 is provided with the detection section 30A. Thus, in cases in which the detection section 30A is an electromagnetic wave transmitter and receiver, for example, electromagnetic waves are transmitted from the detection section (transmitter) 30A, the electromagnetic waves permeate the device body 24 and hit surrounding obstructions, then bounce back, and return to the detection section (receiver) 30A. The distance to the obstructions and so on can be detected by receiving the electromagnetic waves that have returned.

However, since the peripheral information detection device 10 is provided at the vehicle exterior which is exposed to wind and rain, the device body 24 sometimes becomes dirty due to foreign objects or the like adhering to the device body 24. In cases in which foreign objects have adhered to a location of the device body 24 facing to the detection section 30A of the sensor 30, the detection precision of the sensor 30 is sometimes reduced. As illustrated in FIG. 4, in the present exemplary embodiment, the wipers 36 are swung around and foreign objects can be wiped off the outer peripheral face of the device body 24 by driving the motor 34 and rotating the rotary shaft 32. This enables a reduction in the detection rate of peripheral information by the sensors 30 to be suppressed. This enables the detection precision of the sensors 30 to be well maintained. Due to the detection precision of the sensors 30 being well maintained, the running performance of the vehicle 12 is well maintained, enabling automatic driving to be performed regardless of the surrounding environment, such as the weather.

In the present exemplary embodiment, foreign objects are continuously swept away by swinging the wipers 36 around about the outer peripheral face of the device body 24. This enables foreign objects that have adhered to the entire outer peripheral face of the device body 24 to be swept away by one of the wipers 36. Thus, even in cases in which plural sensors 30 are mounted, the detection precision of the detection sections 30A of the plural sensors 30 can be well maintained.

In the present exemplary embodiment, cleaning fluid is applied to the device body 24 through the nozzles 38. This enables foreign objects and dirt to be more effectively removed than in cases in which foreign objects are only wiped away by the wipers 36, without applying cleaning fluid.

As illustrated in FIG. 3, in the present exemplary embodiment, each wiper blade 36B is curved. Thus, in a state in which the wiper blades 36B are swung around about the device body 24, cleaning fluid applied to the outer peripheral face of the device body 24 contacts the wiper blades 36B and is squeezed downward. This enables cleaning fluid to be applied to the entire outer peripheral face of the device body 24. This also enables cleaning fluid to be effectively guided to the receiving dish 44.

As illustrated in FIG. 4, the present exemplary embodiment also includes the cleaning fluid circulation device 28. This enables cleaning fluid that has passed across the outer peripheral face of the device body 24 and accumulated in the receiving dish 44 to be pumped up to the nozzles 38 by the pump 40, and applied to the device body 24 again through the nozzle holes 38A of the nozzles 38. Namely, since the cleaning fluid can be circulated, the amount of cleaning fluid consumed can be reduced. When this is performed, cleaning fluid that has accumulated in the receiving dish 44 passes through the filter 42 and foreign objects are removed, thereby enabling these foreign objects to be suppressed from adhering to the outer peripheral face of the device body 24 again.

The present exemplary embodiment is also provided with the heaters 46 that heat the cleaning fluid and the device body 24. This enables the peripheral information detection device 10 to function well, even in cold regions, for example. Specifically, heating the cleaning fluid enables the cleaning fluid to be suppressed from freezing. Moreover, heating the device body 24 while applying the heated cleaning fluid to the outer peripheral face of the device body 24 enables a film of ice or the like that has adhered to the outer peripheral face of the device body 24 to be melted, enabling the detection precision of the sensors 30 to be well maintained. This enables the peripheral information detection device 10 to function well, even in cold regions.

Note that configuration may be made such that the heater 46 is not normally operated, and is only operated as required. The heater 46 may be controlled so as to be operated in cases in which the external temperature has fallen below a pre-set temperature (such as 0 degrees Celsius). This enables the power required by the peripheral information detection device 10 to be reduced.

Second Exemplary Embodiment

Figure 5:
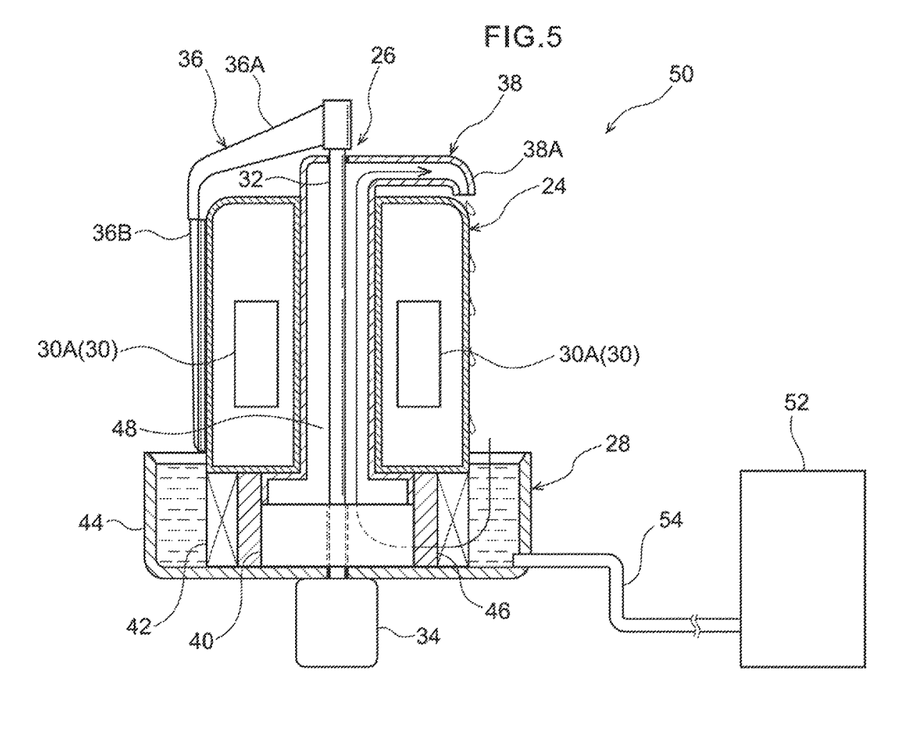
FIG. 5 is a cross-section corresponding to FIG. 3, illustrating a peripheral information detection device according to a second exemplary embodiment.

Explanation follows regarding a peripheral information detection device according to a second exemplary embodiment of the present invention, with reference to FIG. 5. Note that similar configuration to the first exemplary embodiment is applied with the same reference numerals, and explanation thereof is omitted.

As illustrated in FIG. 5, in a peripheral information detection device 50 according to the present exemplary embodiment, a cleaning fluid tank 52 is connected to the receiving dish 44 by a supply flow-path 54. Cleaning fluid is stored in the cleaning fluid tank 52, and one end portion of the supply flow-path 54 is connected to the cleaning fluid tank 52. Another end portion of the supply flow-path 54 is connected to the receiving dish 44.

A fluid level sensor, not illustrated in the drawings, is disposed inside the receiving dish 44, and configuration is such that the fluid level of cleaning fluid that has accumulated in the receiving dish 44 can be detected by the fluid level sensor. When the fluid level of the cleaning fluid that has accumulated in the receiving dish 44 has fallen below a pre-set fluid level, supplementary cleaning fluid is supplied from the cleaning fluid tank 52 to the receiving dish 44 through the supply flow-path 54.

Operation and Advantageous Effects

Explanation follows regarding operation and advantageous effects of the peripheral information detection device according to the present exemplary embodiment. In the peripheral information detection device 50 of the present exemplary embodiment, supplying supplementary cleaning fluid from the cleaning fluid tank 52 to the receiving dish 44 enables the peripheral information detection device 50 to function over a longer duration than in the first exemplary embodiment, and enables the automatic driving distance to be extended. Other operation is similar to that in the first exemplary embodiment.

Note that in the present exemplary embodiment, configuration is such that the fluid level of cleaning fluid that has accumulated in the receiving dish 44 is detected, and supplementary cleaning fluid is supplied from the cleaning fluid tank 52 to the receiving dish 44; however, the present invention is not limited thereto. For example, configuration may be such that supplementary cleaning fluid is continuously supplied from the cleaning fluid tank 52 to the receiving dish 44. Configuration may also be made such that a fixed amount of supplementary cleaning fluid is supplied every time a fixed duration has elapsed.

The first exemplary embodiment and the second exemplary embodiment of the present invention have been explained above; however, the present invention is not limited to the above configurations, and obviously various modes other than the above configurations may be implemented within a range not departing from the spirit of the present invention. For example, in the above exemplary embodiments, the receiving dish 44 is formed in a shape open toward the vehicle upper side; however, the present invention is not limited thereto, and the shape of the receiving dish 44 may be changed. As an example, an upper portion of the receiving dish 44 may be covered such that rainwater or the like does not enter the receiving dish 44. In such cases, providing a slight gap between the outer peripheral face of the device body 24 and the receiving dish 44 enables cleaning fluid to be accumulated in the receiving dish 44, while suppressing the ingress of rainwater.

The above exemplary embodiments include the pair of wipers 36, and the pair of nozzles 38; however, there is no particular limitation to the number of wipers 36 or nozzles 38. For example, configuration may be applied including a single wiper 36 and a single nozzle 38.

In the above exemplary embodiments, configuration is applied in which the nozzles 38 are swung around together with the wipers 36; however, configuration is not limited thereto, and configuration may be applied in which only the wipers 36 are swung around. In such cases, although cleaning fluid is applied through the nozzles 38 to specific locations of the device body 24, cleaning fluid can be applied to the entire outer peripheral face of the device body 24 by swinging the wipers 36 around.

In the above exemplary embodiments, configuration is such that the device body 24 and the cleaning fluid can be heated by the heaters 46; however, the present invention is not limited thereto. For example, a heater that only heats the cleaning fluid may be employed. In such cases, the outer peripheral face of the device body 24 can be warmed by applying heated cleaning fluid to the device body 24. If not used in cold regions, and so on, configuration may be applied that does not include the heaters 46.

In the above exemplary embodiments, the sensors 30 are disposed at the vehicle front side, the vehicle rear side, the vehicle right side, and the vehicle left side, respectively; however, the present invention is not limited thereto. For example, a structure may be applied including three sensors 30, or less. A structure may also be applied in which peripheral information is detected while the sensors 30 are swung around without being fixed.

What is claimed is:

1. A peripheral information detection device comprising:
   a device body that houses a sensor including a detection section that detects peripheral information; and
   a wiping mechanism that wipes off a foreign object that has adhered to a location of the device body, the location facing the detection section, the wiping mechanism including:
      a rotary shaft that is rotatable with respect to the device body;
      a wiper that is attached to the rotary shaft, that abuts a surface of the location of the device body facing the detection section, and that moves around the device body along an outer peripheral face of the device body due to rotation of the rotary shaft, the wiper having a wiper arm and a wiper blade; and
      a nozzle that applies cleaning fluid to the outer peripheral face of the device body, wherein
   the rotary shaft extends vertically and extends through the device body so that an upper end portion of the rotary shaft is located vertically above the device body, the upper end portion of the rotary shaft being attached to the wiper arm,
   an upper end portion of the wiper blade is attached to a leading end portion of the wiper arm,
   the wiper blade extends downward along the outer peripheral face of the device body, and
   the wiper blade is curved toward a direction opposite to a rotation direction of the wiper blade so that the upper end portion of the wiper blade is located ahead of a lower end portion of the wiper blade relative to the rotation direction of the wiper blade.

2. The peripheral information detection device of claim 1, further comprising:
   a receiving dish that receives the cleaning fluid that has been applied to the device body through the nozzle; and a pump that supplies the cleaning fluid that has accumulated in the receiving dish to the nozzle.

3. A self-driving vehicle comprising:
the peripheral information detection device of claim 1; and
a switching section that switches between a first driving mode in which the vehicle is driven based on the peripheral information detected by the peripheral information detection device and a second driving mode in which a driver manually drives the vehicle by operating a steering wheel of the vehicle.

4. The peripheral information detection device of claim 1, wherein
the rotary shaft extends through a central portion of the device body.

5. The self-driving vehicle of claim 3, wherein
the peripheral information detection device includes a heater for heating the cleaning fluid and the device body, and
the heater is disposed at a position to simultaneously heat upstream and downstream of a flow-path of the cleaning fluid.

6. The self-driving vehicle of claim 5, wherein the heater is positioned on a vehicle ceiling of the self-driving vehicle.

7. The self-driving vehicle of claim 3, wherein the device body is formed in a circular tube shape with its axial direction extending vertically.

* * * * *